UNITED STATES PATENT OFFICE.

ARVID NILSON, OF CHICAGO, ILLINOIS, ASSIGNOR TO WAHL-HENIUS INSTITUTE OF FERMENTOLOGY, OF CHICAGO, ILLINOIS, A CORPORATION OF ILLINOIS.

MANUFACTURE OF ARTIFICIAL RUBBER.

964,304.            Specification of Letters Patent.     Patented July 12, 1910.

No Drawing.      Application filed September 13, 1909. Serial No. 517,453.

*To all whom it may concern:*

Be it known that I, ARVID NILSON, a subject of the King of Sweden, residing at Chicago, in the county of Cook and State of Illinois, have invented a new and useful Improvement in the Manufacture of Artificial Rubber, of which the following is a specification.

The object of my invention is to provide a new article of artificial rubber, or substitute for rubber, and a novel process or manufacturing the same, whereby a substance is produced at comparatively small expense for ingredients and manufacture which shall possess in a high degree the elastic and wearing properties of commercial rubber.

To practice my improved process I prefer to observe the following procedure: I dissolve bichromate of potash in water in the proportion of about four pounds of the bichromate of potash to about twenty pints of water, preferably heating the water as by subjecting it to the action of steam. To this solution I add preferably about 0.48 pounds of strong hydrochloric acid (of 1.19 specific gravity) or another suitable acid, as sulfuric acid, that will liberate the chromic anhydrid ($CrO_3$) from the solution by combining with the potash of the bichromate of potash, and one pint of grain alcohol of about 0.8 specific gravity, or other substance, as sulfurous acid, that will exert the effect of reducing the chromic anhydrid to chromic oxid, these additions being made while the solution is under the influence of heat, for a period of fifteen minutes, more or less. I then stir into and thoroughly mix with the resultant liquid about seventy-five pounds of glycerin and add sufficient caustic soda, or other suitable alkali, if necessary, to reduce excessive acidity to approximate neutrality or slight alkaline reaction. The liquid resulting from the procedure thus described is mixed with a glue-like substance, preferably ordinary commercial glue in the form of a dry powder, though gelatin or brewer's isinglass may be used, the preferred proportions being about one quart of the liquid to about one pound of the glue, and the liquid, which should not be in a hot condition but at ordinary room-temperature in making this mixture, should be well stirred before adding the glue. The mixture is thereupon preferably heated and thoroughly stirred, the heating being preferably to about 120° F. to 150° F. for about two hours, more or less, thereby to cause the chromic oxid to act chemically upon the glue and combine with it more quickly and completely; whereupon the resultant plastic mass may be hardened by cooling, as by exposure to the atmosphere, thereby to reduce it to a solid condition in which it exhibits the rubber-like properties referred to.

I have primarily devised my improved article as a filler, more particularly for tubular rubber vehicle tires to render them non-pneumatic and puncture-proof with the resilient and other properties required of pneumatic tires. When used as a filler for such tubular or other forms, it is best to introduce the mixture therein before heating it, as aforesaid, and thereupon heat it in the form to effect rapidly the stated action of the chromic oxid.

What I claim as new and desire to secure by Letters Patent is—

1. The method of manufacturing the rubber-like material herein described, which consists in making a solution of bichromate of potash, adding to said solution an acid that will combine with the potash of the bichromate of potash to liberate the chromic anhydrid, and also adding to said solution a substance, such as alcohol, to reduce the chromic anhydrid to chromic oxid, adding to the resultant liquid glycerin, and mixing the resultant mass with a glue-like substance.

2. The method of manufacturing the rubber-like material herein described, which consists in making a solution of bichromate of potash, adding to said solution an acid that will combine with the potash of the bichromate of potash to liberate the chromic anhydrid, and also adding to said solution a substance, such as alcohol, to reduce the chromic anhydrid to chromic oxid, adding to the resultant liquid glycerin, mixing the resultant mass with a glue-like substance, and heating the resultant mixture.

3. The method of manufacturing the rubber-like material herein described, which consists in dissolving bichromate of potash in water, adding to the solution, while under the influence of heat, hydrochloric acid and alcohol, thereupon mixing with the resultant liquid glycerin and an alkali, such as caustic soda, and mixing glue with the resultant liquid, and heating and stirring the resultant mixture preparatory to cooling the same to solidify it.

ARVID NILSON.

In presence of—
L. HEISLAR,
R. SCHAEFER.